United States Patent [19]

Watkins, Jr.

[11] 4,063,742
[45] Dec. 20, 1977

[54] ABRADABLE FLUID SEAL FOR AIRCRAFT GAS TURBINES

[75] Inventor: Shelton Watkins, Jr., Louisville, Ky.

[73] Assignee: Kentucky Metals, Inc., New Albany, Ind.

[21] Appl. No.: 715,628

[22] Filed: Aug. 18, 1976

[51] Int. Cl.² .............................................. F16J 15/32
[52] U.S. Cl. ....................................... 277/53; 415/174
[58] Field of Search ...................... 415/174; 277/53–57

[56] References Cited

U.S. PATENT DOCUMENTS 3,291,382  12/1966  Blackhurst et al. .................. 415/174

Primary Examiner—Robert I. Smith
Attorney, Agent, or Firm—Arthur F. Robert

[57] ABSTRACT

An abradable fluid seal for use in the space between two relatively movable members, such as the space between the cylindrical path of the rotating blade tips in an aircraft gas turbine and the surrounding stationary casing of the turbine. The preferred seal uses a series of thin narrow elongate metal strips. These are assembled and secured in side-by-side relationship to form a flexible integrated assembly having, in the direction of its thickness, an outer base portion and an inner seal portion. Each strip has corresponding base and seal portions and, over a given length, a corresponding succession of undulations in each portion. The undulations in the base portion are three flatsided semi-hexagonal figures, each having, between its two slanted sides, a flat crest which is bonded to the corresponding flat crest of a semi-hexagonal figure in an immediately adjacent strip so that said figures cooperate to form an integral honeycomb, the voids of which extend in the direction of the assembly's thickness dimension. The undulations in the seal portion of each strip are spaced across the width of the assembly from the corresponding undulations in each immediately adjacent strip so as to cooperate therewith to form therebetween a free undulating passageway, extending lengthwise of the assembly's seal portion. Each alternate strip has its corresponding seal and base portion undulations pointing in the same direction. Each interposed strip has its corresponding seal and base portion undulations pointing in opposite directions.

9 Claims, 8 Drawing Figures

ABRADABLE FLUID SEAL FOR AIRCRAFT GAS TURBINES

BACKGROUND OF THE INVENTION

1. Field of the Invention

While this invention relates to the abradable seal art generally, it is particularly adapted for use in sealing fluids of aircraft gas turbines and the like.

2. Description of the Prior Art

In gas turbines, it is desirable to seal the space between the tips of rotating turbine blades and the surrounding casing by annular sealing means having a structurally strong outer annular base portion secured to the turbine casing or other parts thereof and an inner annular seal portion which, due to the small clearance required to minimize leakage, may actually be rubbed during operation by the rotating blade tips, which, when rubbed, will yield to the tips rather than subject them to significant damage. The foregoing statement also applies to seals around bearings, shroud seals and to the space between the inner bore of the stationary nozzle diaphragm assembly and the series of annular rib-like serrations conventionally provided on the adjacent portion of the rotating turbine core structure. Damage to the serrations on the turbine torque tubes or core is particularly to be avoided.

Typical annular tip seals, and, in some cases, core seals, are shown in the following U.S. Pats. viz: Bobo U.S. Pat. No. 2,963,307, which uses, for tip and core seal purposes, a series of spaced parallel "soe" strips (i.e. standing on edge strips) shaped with semi-hexagonal undulations secured together to form a conventional honeycomb; Morley et al. U.S. Pat. Nos. 3,082,010 and 3,092,393 which disclose tip seals composed of spaced parallel "soe" strips with means for spacing them; Desmond U.S. Pat. No. 3,694,884 which shows a tip seal composed of a singly corrugated "soe" strip mounted on a base ring; Moscowitz U.S. Pat. No. 3,867,071 which shows a tip seal composed of a series of corrugated "soe" strips mounted on a base ring, these strips comprising alternate "soe" strips having base portions only and interposed "soe" strips having both base and seal portions, the base portions of all strips cooperating to form a base honeycomb, while the seal portions of the interposed strips project beyond the base honeycomb in spaced parallel relationship; and Long U.S. Pat. No. 3,916,054 which shows, in FIG. 5, a series of corrugated "soe" strips mounted edgewise on an outer circular strip wherein the corrugations in alternate strips are slanted one way while those in the interposed strips are slanted in the opposite way, and, in FIGS. 6-12, various other corrugated arrangements which are similar except that, in FIG. 6, the alternate strip corrugations are radial, in FIG. 7, the alternate strip corrugations slant one way at one angle while the interposed strip corrugations slant the same way at a different angle, in FIG. 8, the alternate strip corrugations slant one way while each one in the interposed strips is "elbow" slanted, i.e. slanted 1st one way and then the other, in FIG. 9, the alternate strip corrugations curve radially one way while those in the interposed strips curve radially the opposite way, in FIG. 10, all strips have elbow corrugations containing slanted base and radial seal sections with the slanted base sections in the alternate strips going one way and, in the interposed strips, the other way, in FIG. 11, all strips have radial corrugations terminating at the base and seal ends in slanted portions, the slant of the alternate strips being the reverse of the slant of the interposed strips, and, in FIG. 12, the alternate strips have the elbow slant of FIG. 8 while the interposed strips have straight radial corrugations of FIGS. 6 and 12.

SUMMARY OF THE INVENTION

Objects Of The Invention

The principal objects of the present invention are: to provide a series of thin narrow elongate metal strips, which are easy to shape with desired undulations, easy to assembly in side-by-side "soe" relationship, and easy to secure the base portion undulations of adjacent strips together to integrate the base portion of the strips into a conventional honeycomb structure; and to provide a fluid seal assembly having a honeycomb base portion while maintaining the seal portion undulations of adjacent strips in spaced relationship having a weak structural strength and, therefore, being readily subject to "smear". By "smear", I mean that the outermost edges of the thin "soe" strips in the seal portion are readily softened by frictional heat, readily bent over in the direction of rotation through contact with an adjacent rotating tip or serration without damaging either, and, when bent over or "smeared", forms a more or less thin smooth bore wall, which remains an effective fluid seal.

Another important object is to provide an advantageous seal integrated by a conventionl widely used honeycomb which can be made on conventional honeycomb welding equipment, which provides maximum structural strength and which can be installed by brazing and other well-known techniques.

Statement Of The Invention

The novel fluid seal of the present invention includes a series of thin narrow elongate metal strips having base and seal portions with a unique arrangement of undulations wherein each alternate strip of the series has, between the inner and outer limits of its thickness, corresponding seal and base portion undulations pointing in the same direction while each interposed strip of the series has, between the inner and outer limits of its thickness, corresponding seal and base portion undulations pointing in opposite directions.

The fluid seal product is produced by assembling and securing said strips together in side-by-side standing on edge ("soe") relationship such that the undulating strips in the outer base portion are of semi-hexagonal form bonded together into a structurally strong hexagonal honeycomb while the undulating strips in the inner seal portion are (preferably) of V-shaped corrugated form maintained in spaced parallel relationship with an elongate corrugated passageway extending therebetween in the direction of the length of the strips and with the crests of their undulations noy only extending radially across the thickness of the seal portion but preferably slanted in the direction of rotation so that the bore-edges of the thin strips tend to provide the yieldability required in a gas turbine for good fluid sealing purposes without subjecting the turbine rotor to objectionable damage or wear.

Under some turbine operating conditions, the rotor may expand sufficiently to bring either or both its blade tips and its annular core ribs into frictional engagement with the bore-forming spaced fluid-sealing edges of the strips. The ensuing rubbing action subjects these edges to frictional heat, tends to soften them as a result of such heat and to smear these softened edges into a very thin smooth bore surface which may actually improve the seal without damaging the rotor tips or core serrations or ribs.

BRIEF DESCRIPTION OF THE DRAWINGS

The invention is illustrated in the accompanying drawings wherein:

FIG. 7 is a somewhat schematic view wherein FIG. 6 is superimposed over FIG. 5 to show the relationship between the undulations in the seal and base portions of the same two alternate strips and the same two interposed strips.

DESCRIPTION OF THE PREFERRED EMBODIMENT

Figure 1:
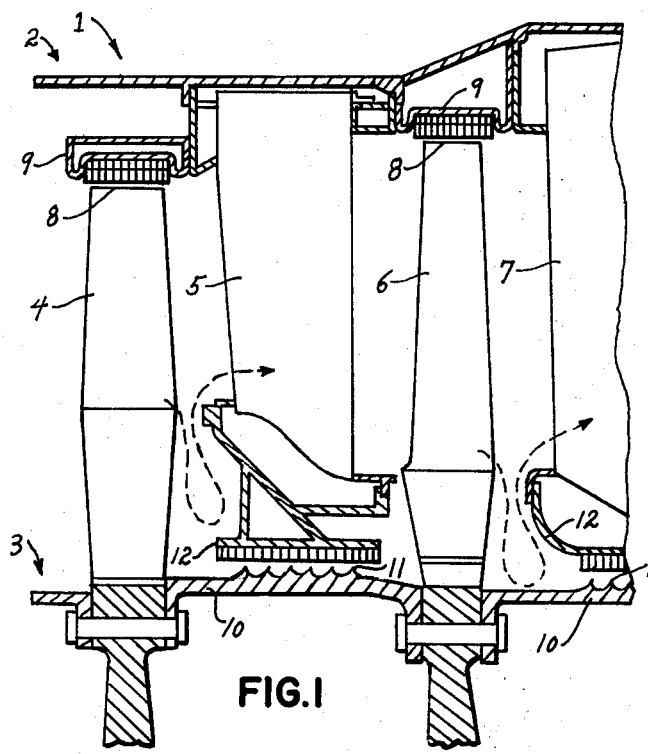
FIG. 1 is a fragmentary view of a gas turbine in which fluid seals, made in accordance with my invention, are used as tip seals and core seals.

FIG. 1, in this case, is based upon FIG. 1 of the Bobo U.S. Pat. No. 2,963,309, which explains the leakage problem and how fluid seals are used to minimize it. The contents of the Bobo patent thus apply to this application and are incorporated herein by reference.

In FIG. 1, the gas turbine 1 has a stationary casing 2 and a rotor 3. In operation, hot motive gas passes successively through the rotating bucket 4 of the first stage, the stationary nozzle diaphragm 5, the rotating bucket 6 of the second stage, the stationary nozzle diaphragm 7, etc. through the last stage. It is desirable to prevent the gas from leaking between bucket tips 8 and the surrounding casing structure 9 and also between the annular serrations 11 of the rotor 10 and the adjacent portions of the stationary diaphragms 12. To this end, the fluid seals of the present invention, as illustrated, are stationarily mounted on stationary parts of the turbine surrounding the tips of the rotating buckets 4, 6, etc., and surrounding the ribs 11 of the rotating core 10.

Figure 2:
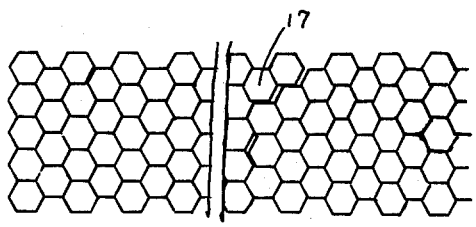
FIG. 2 is a broken plan view of the outer face of the base portion of one of the seals used in FIG. 1.
Figure 3:
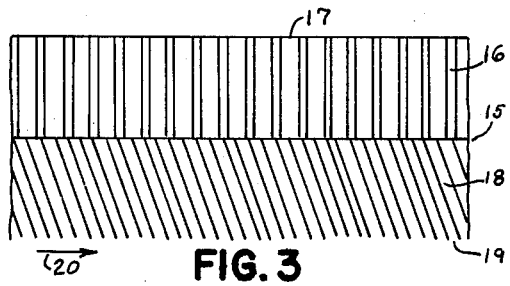
FIG. 3 is a fragmentary side elevation of the seal of FIG. 2.
Figure 4:
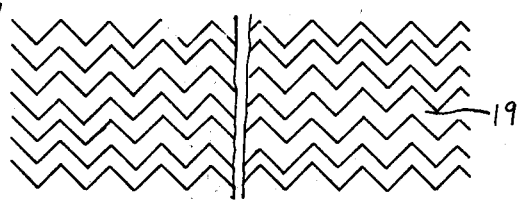
FIG. 4 is a broken plan view of the inner face of the seal portion of the fluid seal shown in FIGS. 2 and 3.

A fragmentary portion of a circular or cylindrical fluid seal, constructed in accordance with the present invention, is indicated in FIGS. 2, 3 and 4. In FIG. 3, the circular fluid seal illustrated comprises: a changeover portion 15 between an outer base portion 16 having an outer or peripheral face 17 and an inner seal portion 18 having an inner or bore face 19. As seen in FIG. 2, the outer face 17 of the base portion 16 appears as a honeycomb. As seen in FIG. 4, the inner face 19 of the inner seal portion 18 appears as a series of spaced parallel corrugated strips. In FIG. 3, the honeycomb extends radially inward from outer face 17 while the corrugations extend radially inward from the changeover portion 15 and slants forwardly in the direction of rotation of the rotating core 10 which direction is indicated by arrow 20. The angle of the slant preferably approximates 30° to the radial but the corrugations may extend either straight radially at about a zero angle or slant forwardly up to about 40°.

Figure 5:
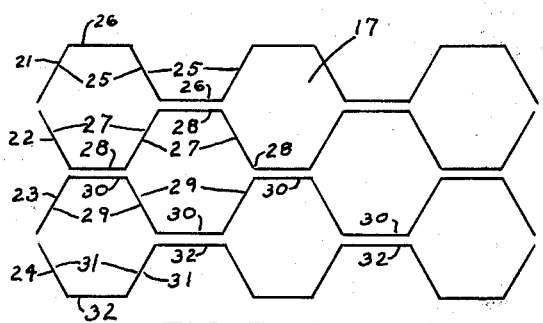
FIG. 5 is a somewhat schematic view showing the relationship between the undulations of the first and third alternate and the second and fourth interposed strips forming a part of the base portion of the seal as seen in FIG. 2.

FIG. 5 is an enlarged view of a fragmentary portion of the outer face 17 of the base honeycomb portion 16 shown in FIGS. 2 and 3 with the adjacent bonded crests of the undulations in adjacent strips separated slightly for clarity rather than being shown in close contact with each other. The base portion 16, as illustrated in FIG. 5, comprises: a first alternate strip 21; a first interposed strip 22; a second alternate strip 23; and a second interposed strip 24. In other words, the odd numbered strips 21 and 23 are called alternate strips to distinguish them from the even numbered strips 22 and 24, which are called interposed strips. The first alternate strip 21 is formed with a succession of undulations in the form of three-sided semi-hexagonal figures, each such figure having a pair of flat slanted sides 25 and a flat crest 26. The first interposed strip 22 is formed with a corresponding succession of undulations having a pair of slanted sides 27 and a flat crest 28. The second alternate strip 23 is identical to the first alternate strip 21; hence, has slanted sides 29 and flat crest 30. The second interposed strip 24 is identical to the first interposed strip 22; hence, has slanted sides 31 and a flat crest 32. Before passing, it may be specifically noted: that the first alternate strip 21 and the first interposed strip 22 have their adjacent flat crests 26, 28 bonded together; that the first interposed strip 22 and the second alternate strip 23 have their adjacent flat crests 28, 30 bonded together; and that the second alternate strip 23 and the second interposed strip 24 have their adjacent flat crests 30, 32 bonded together.

Figure 6:
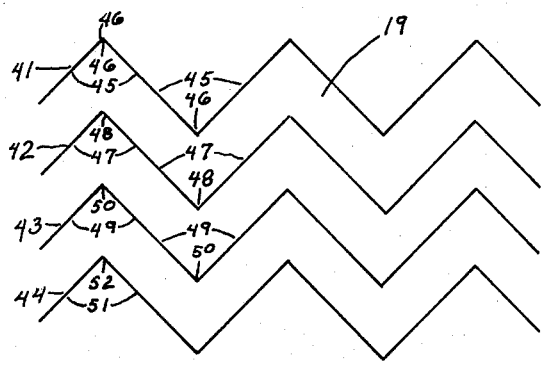
FIG. 6 is a somewhat schematic view showing the relationship between the undulations of the same two alternate and the same two interposed strips forming a part of the seal portion of the seal as seen in FIG. 4.

FIG. 6 is an enlarged view of a fragmentary portion of the inner face 9 of the inner seal portion 18 shown in FIGS. 3 and 4, this figure illustrating the seal portions of the same four strips that are shown in FIG. 5 in the same order as they appear in FIG. 5. For the sake of clarity, however, alternate strip 21 of FIG. 5 is designated alternate strip 41 in FIG. 6. Likewise, interposed strip 22, alternate strip 23 and interposed strip 24 of FIG. 5 are respectively designated as interposed strip 42, alternate strip 43 and interposed strip 44 in FIG. 6. The important thing to understand is that strips 21 and 41 constitute one and the same alternate strip, and 22 and 42 constitute a single interposed strip, that 23 and 43 constitute a single alternate strip and 24 and 44 constitute a single interposed strip.

Also each of the strips 41 through 44 is formed with a succession of undulations in the form of two-sided corrugations. In summary, then, the seal portion structure 18 illustrated in FIG. 6 comprises, an alternate strip 41 having sides 45 and crest 46; and interposed strip 42 having sides 47 and crest 48; an alternate strip 43 having sides 49 and crest 50; and interposed strip 44 having sides 51 and crest 52.

Figure 7:
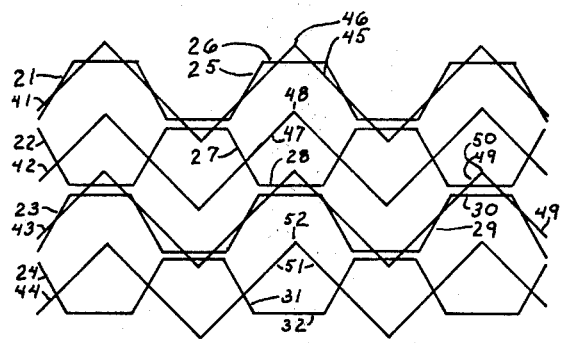

FIG. 7 shows the same four strips already shown in FIGS. 5 and 6 in the same order as they appear in those figures. In FIG. 7, the seal portion of FIG. 6 is superimposed over the base portion of FIG. 5. The fluid seal structure illustrated in FIG. 7, therefore, comprises: a first alternate strip 21, 41; a first interposed strip 22, 42; a second alternate strip 23, 43; and a second interposed strip 24, 44. Now it will be noted: that, in the first alternate strip 21, 41, each base portion undulation 25, 26 and the "corresponding" seal portion undulation 45, 46 point in the same direction; that, in the interposed strip 22, 42, each base portion undulation 27, 28 and the "corresponding" seal portion undulation 47, 48 point in opposite directions; that, in the alternate strip 23, 43, each base portion undulation 29, 30 and the "corresponding" seal portion undulation 49, 50 point in the same direction; and that, in the alternate strip 24, 44, each base portion undulation 31, 32 and the "corresponding" seal portion undulation 51, 52 point in opposite directions.

Figure 8:
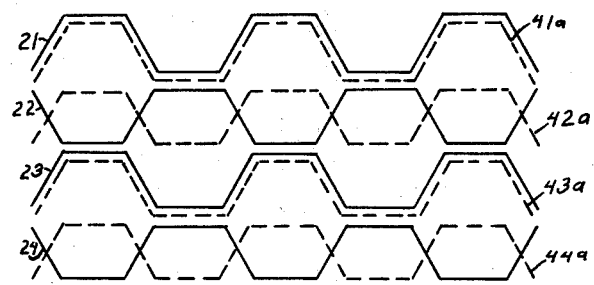
FIG. 8 is a schematic view, corresponding to the view seen in FIG. 7, showing a modification using three-sided hexagonal undulations in the seal portion in place of the two-sided corrugations used in the seal portion of FIGS. 1-7.

FIG. 8, like FIG. 7, shows four single strips, each having a base portion and a seal portion. The base portion of each of the four strips are provided with three-sided semi-hexagonal undulations corresponding exactly to those shown in FIG. 7; hence, the base portions of these four FIG. 8 strips are respectively designated 21, 22, 23 and 24. The base undulations of the various strips cooperate to form a honeycomb.

Again, in FIG. 8, each seal portion of the four strips is provided with three-sided hexagonal undulations, in place of the two-sided corrugated undulations used in the seal portion of the FIGS. 1–7 embodiment. The seal portions of these four FIG. 8 strips are shown in dotted lines and respectively designated 41a, 42a, 43a and 44a. It will be understood that the base and seal portions of the first alternate strip 21, 41a preferably are vertically or radially aligned, although, for clarity, they are shown in FIG. 8 in spaced offset relationship. In the next strip, interposed strip 22, 42a, each undulation in the base portion 22 is reversed relative to the "corresponding" undulation in the seal portion 42a. The relative arrangement of the undulations in the base and seal portions 23, 43a of the second alternate strip is identical to that of the first alternate strip. Likewise, the relative arrangement, undulations in the base and seal portions 24, 44a of the second interposed strip, is identical to that of said first interposed strip 22, 42a.

While I have illustrated the hexagonal cells of the FIGS. 1–7 embodiment and the FIG. 8 embodiment as having six sides of equal length from one side to the other, I may use sides of unequal length. For example, square-celled honeycombs have four sides of equal length and two flattened crests which are of comparatively short length; hence a square cell is, in reality, a six-sided figure composed of four sides of equal length and two sides of comparatively short length. The term "three-sided semi-hexagonal undulation" is, therefore, used herein to designate a three-sided figure having sides of equal or unequal length. Furthermore, while the cell-forming undulations are made from flat-faced stock, they may be made from crinkled stock which is well-knwon and which includes a large number of very small undulations along its length. Whatever strips are employed, they may be composed of conventional materials such as stainless steel, nickel-base alloys, cobalt-base alloys or any of other suitable resistance weldable materials.

It will be appreciated that my abradable fluid seal is characterized by a series of thin narrow elongate flexible fluid-seal strips, each having, in the direction of its width dimension, which is the same as the thickness dimension of a cylindrical or ring-type fluid seal as a whole, an outer base portion and an inner seal portion.

Each strip contains, in the direction of its length dimension, one succession of undulations in its crest portion and another succession of corresponding undulations in its seal portion. Some strips are unique in that they have the crests, of their corresponding seal and base portion undulations, extending across the length dimension of the strip but pointing in opposite directions from said length dimension so that the base portion crests point one way while the seal portion crests in the same strip point in the opposite way. Thus, in FIG. 7, alternate strip 22, 42 has its base crests 28 and seal crests 48 point in opposite directions as do the crests 32 and 52 of alternate strip 24, 44. In FIG. 8, alternate strip 22, 42a and alternate strip 24, 44a each have their base and seal crests point in opposite directions.

The term "assembly having, in the direction of its thickness," as used herein, means in a direction corresponding to the radial thickness of the flexible seal assembly in the "circular form" it assumes when installed for use as a circular seal in a circular space such as the circular space between the cylindrical path of the rotating blade tips in an aircraft gas turbine and the surrounding bore wall of the stationary casing of the turbine. Similarly, the term "each undulation in the seal portion of each strip being axially aligned with a corresponding undulation in an adjacent strip", as used herein, means aligned in a direction corresponding to the axial width of the flexible seal assembly in said "circular form". Also, the term "extending lengthwise of the assembly's seal portion", as used herein, means in a direction corresponding to the circular length of the flexible seal assembly in said "circular form".

Having described my invention, I claim:

1. An abradable fluid seal for use in the space between two relatively movable members, such as the circular space between the cylindrical path of the rotating blade tips in an aircraft gas turbine and the surrounding bore wall of the stationary casing of the turbine wherein the seal has a circular length, a radial thickness, and an axial width, comprising:
    A. a series of thin narrow elongate metal strips assembled in side-by-side or face-to-face relationship to form a flexible assembly composed of odd numbered alternate strips and even numbered interposed strips, said assembly having, in the direction of its thickness, an outer base portion and an inner seal portion, and, over a given length, one succession of undulations in its outer base portion and another succession of corresponding undulations in its inner seal portion,
        1. the undulations in the base portion being three-sided semi-hexagonal figures, each having, between two slanted sides, a flattened crest which is bonded to the corresponding crest of a semi-hexagonal figure in an immediately adjacent strip so that said figures cooperate to form an integral honeycomb, the voids of which extend in the direction of the assembly's thickness dimension,
        2. each undulation in the seal portion of each strip being axially aligned with a corresponding undulation in an adjacent strip and spaced therefrom so that immediately adjacent strips cooperate with each other to form therebetween a free undulating passageway, extending lengthwise of the assembly's seal portion, a. each alternate strip has its corresponding seal and base portion undulations point in the same direction, and
  b. each interposed strip has its corresponding seal and base portion undulations point in opposite directions.
2. The fluid seal of claim 1 wherein:
  A. the slanted sides and the flattened crests of the base portion undulations are of equal length.
3. The fluid seal of claim 1 wherein:
  A. the undulations in the seal portion comprise two-sided corrugations.
4. The fluid seal of claim 1 wherein:
  A. the undulations in the seal portion comprise three-sided semi-hexagonal figures.
5. In an abradable fluid seal for use in the space between two relatively movable members, such as the circular space between the cylindrical path of the rotating blade tips in an aircraft gas turbine and the surrounding bore wall of the stationary casing of the turbine wherein the seal has a circular length, an axial dimension and a radial dimension, an improvement comprising:
  A. a thin elongate fluid-seal strip having opposite inner and outer edges, a narrow width therebetween, an outer base portion extending lengthwise along said outer edge and widthwise partially across the width of the strip, an inner seal portion extending lengthwise along said inner edge and partially across the width of the strip, and, over a given length, one succession of undulations in its outer base portion and another succession of corresponding undulations in its inner seal portion,
    1. the crests, of its base portion undulations, extend across the width of said base portion, and
    2. the crests, of its seal portion undulations, extend across the width of said seal portion.
6. The improvement of claim 5 wherein:
  A. the crests of some seal portion undulations in the strip all point in one direction while the crests of the corresponding base portion undulations in the strip all point in the opposite direction; and
  B. the crests of other seal portion undulations in the strip all point in said opposite direction while the crests of the corresponding base portion undulations in the strip all point in said one direction.
7. The improvement of claim 5 wherein:
  A. the crests of some base portion undulations in the strip and the corresponding seal portion undulations in the strip all point in one direction; and
  B. the crests of other base portion undulations in the strip and the corresponding seal portion undulations in the strip all point in the opposite direction.
8. In combination:
  A. the improvement of claim 7 wherein said strip comprises an alternate or first strip; B. an interposed or second strip identical to the first strip except that corresponding base and seal portion undulations of the second strip point in opposite directions; and
  C. means securing the first and second strips in assembled side-by-side relationship
    1. with the crests of some base portion undulations in the first strip pointing away from the corresponding base portion undulations in the second strip,
    2. with the crests of other base portion undulations in the first and second strips pointing toward, abutting and secured to each other,
    3. with the crests of some seal portion undulations in the first strip and the corresponding seal portion undulations in the second strip all pointing in one direction,
    4. with the crests of other seal portion undulations in the first strip and other corresponding seal portion undulations in the second strip all pointing in the opposite direction, and
    5. with the seal portion undulations of both first and second strips spaced from each other to provide therebetween an unobstructed passageway extending in free undulating fashion along the length of the elongate strips.
9. The combination of claim 8 wherein:
  A. the crests of some base portion undulations in the first strip and the corresponding seal portion undulations in the first strip all point in one direction while the crests of other base portion undulations in the first strip and the corresponding seal portion undulations in the first strip all point in the opposite direction;
  B. the crests of some base portion undulations in the second strip all point in said opposite direction while the crests of the corresponding seal portion undulations in the second strip all point in said one direction; and
  C. the crests of other base portion undulations in the second strip all point in said one direction while the crests of the corresponding seal portion undulations in the second strip all point in said opposite direction.

Notice of Adverse Decision in Interference

In Interference No. 100,259, involving Patent No. 4,063,742, S. Watkins, Jr., ABRADABLE FLUID SEAL FOR AIRCRAFT GAS TURBINES, final judgment adverse to the patentee was rendered June 12, 1980, as to claim 5.

[*Official Gazette September 30, 1980.*]